(12) United States Patent
Selby et al.

(10) Patent No.: US 6,257,655 B1
(45) Date of Patent: Jul. 10, 2001

(54) PROTECTIVE SKIRT FOR VEHICLE TRANSPORT TRAILERS

(76) Inventors: Glen L Selby, 17238 Bethany Cir., Aurora, CO (US) 80013; Darrell D. Hepner, 1968 Payne Ct., Aurora, CO (US) 80011

( * ) Notice: Subject to any disclaimer, the term of this patent is extended or adjusted under 35 U.S.C. 154(b) by 0 days.

(21) Appl. No.: 09/425,876

(22) Filed: Oct. 22, 1999

(51) Int. Cl.[7] .............................. B60J 7/00; B60J 37/00; B60N 2/00; B60N 3/00; B60R 27/00
(52) U.S. Cl. ............................................. 296/181; 410/24
(58) Field of Search ................................ 296/32, 36, 155, 296/181; 410/24, 26

(56) References Cited

U.S. PATENT DOCUMENTS

| | | | |
|---|---|---|---|
| D. 153,931 | * | 5/1949 | Francis . |
| 3,709,552 | * | 1/1973 | Broadbent . |
| 4,545,611 | * | 10/1985 | Broadbent . |
| 4,826,236 | * | 5/1989 | Bennett . |
| 4,952,009 | * | 8/1990 | Mountz et al. . |
| 5,282,663 | * | 2/1994 | Horton . |
| 5,911,467 | * | 6/1999 | Evans et al. . |

* cited by examiner

*Primary Examiner*—D. Glenn Dayoan
*Assistant Examiner*—Scott Carpenter
(74) *Attorney, Agent, or Firm*—Ralph F. Crandell (57) ABSTRACT

A protective skirt for an open frame trailer adapted to transport vehicles. The trailer includes a wheeled chassis supporting a frame and track assembly. The trailer has a front-end adapted to be mounted in towing engagement on a tractor truck, a rear end adapted for receiving vehicles to be carried, and a middle section including the frame and track superstructure for supporting the vehicles. The protective skirt includes a pair of first skirt sections mounted one on each side of the chassis in screening position at the trailer front end, a pair of second skirt sections mounted on the chassis one on each side thereof in screening position at the trailer middle section, a pair of third skirt sections mounted in screening position one on each side of the chassis above the wheels, and a pair of fourth skirt sections mounted on the chassis one on each side in screening position at the trailer rear section. The skirt assembly protects vehicles carried on the trailer against damage from rocks and road debris.

12 Claims, 9 Drawing Sheets

PROTECTIVE SKIRT FOR VEHICLE TRANSPORT TRAILERS

BACKGROUND OF THE INVENTION

1. Field of the Invention

The present invention relates to trucks and trailers for transporting vehicles, and more specifically to vehicle transport trailers. More particularly, the present invention relates to protective skirts or curtains for protecting vehicles carried on such transport trailers against damage from rocks and road debris.

2. Description of the Prior Art

As a used herein, the term vehicle transport trailer refers to a trailer attachable to a tractor or truck and utilized for shipping a number of vehicles such as cars or trucks at one time. See, for example, U.S. Pat. No. 3,880,457, issued Apr. 29, 1975, to Paul Jones, Jr., for Trailer for Transporting Vehicles.

SUMMARY OF THE INVENTION

The present invention is embodied in a protective skirt or curtain for an open frame trailer adapted to transport vehicles such as cars and trucks. The trailer has a wheeled chassis supporting a superstructure including a frame and track assembly with vertically extending frame posts. The front-end of the trailer is adapted to be mounted in towing engagement on a tractor truck, while the rear end is adapted for receiving vehicles to be carried. The protective curtain of the invention includes a pair of first skirt sections mounted on the front end of the chassis one on each side thereof in screening position to protect the front end of carried vehicles. A second pair of skirt sections is mounted on the chassis one on each side thereof in screening position on the trailer middle section. A third pair of skirt sections is mounted in screening position one on each side of said chassis above the wheels. A fourth pair of skirt sections is mounted on the chassis one on each side thereof in screening position at the rear of the trailer. With the protective skirt construction of this invention, vehicles carried on said trailer are effectively protected against damage from flying rocks and road debris.

More specifically, the protective skirt is a rectangular curtain panel defining upper and lower edges and lateral end edges joining said upper and lower edges. Each lateral edge has a hem defining a sleeve. A plurality of spaced apart D-rings are secured to the upper and lower edges of the skirt panel and receive supporting cables secured to and extending between chassis frame uprights. Support tubes extend vertically through the hem tubes and releasably engage the chassis frame uprights to stretch and hold the skirt panel tightly on the trailer. At pone end of the panel, the support tubes engage the frame uprights by a pin and hook mechanism, and at the other end the support post is secured to the frame by a ratchet mechanism.

DESCRIPTION OF THE PREFERRED EMBODIMENT

Figure 1:
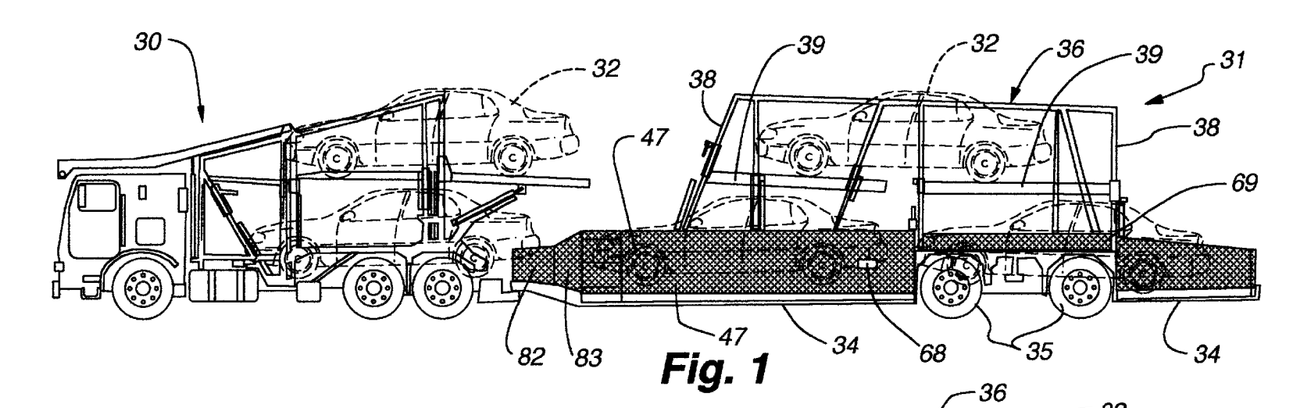
FIG. 1 is a side elevation view of a tractor truck and vehicle transport trailer including protective curtains or skirts embodying the present invention.

The present invention as shown in the drawings is embodied in a system of protective curtains or skirts for use on an open frame vehicle transport trailer for protecting the carried vehicles from damage as the result of flying road debris kicked up by the wheels of the transport tractor and passing vehicles. An illustrative vehicle transport tractor 30 and trailer 31 is shown in FIG. 1 with the protective curtain or skirts of the present invention mounted on the trailer 31 in protective association with the carried vehicles such as cars or trucks 32. The tractor truck 30 may be any conventional over-the-road tractor truck or may be a specifically modified tractor truck adapted to carry a plurality of vehicles, as shown in FIG. 1. The tractor truck 30 conventionally tows a vehicle-carrying transport trailer 31, an appropriate hitch (not shown) being provided, such as a fifth wheel hitch, for coupling the trailer 31 to the tractor truck 30.

The trailer 31 includes a chassis 34 supported on wheels 35 adjacent its rear end, and supports a superstructure incorporating a frame 36 with upright posts 38 and tracks 39 with various mechanisms including hydraulic cylinders 40 which facilitates the loading of vehicles on the trailer 31 for transport.

The system of skirts or curtains and mountings therefor 41 embodying the present invention is mounted on the vehicle-carrying trailer 31, as shown in the drawings, in position for protecting transported vehicles 32 against damage from rocks and road debris, and yet are easily collapsed or positioned to afford access to the various trailer mechanisms for loading and unloading automobiles and other vehicles. To this end, the skirt or curtain assembly 41 is formed in a plurality of sections, four such sections 42, 43, 44, and 45 being shown in the drawings. These sections include a front section 42, as shown in FIGS. 1–4, 5, 8–10 and 11, positioned adjacent the front end of the trailer, a principal side section 43 extending along the side of the trailer, as shown in FIGS. 1–4, 6, 7, 9, and 12–15, a secondary side section 44 positioned along the trailer side above the wheels, as shown in FIGS. 1–3 and, a rear section 45 adjacent the rear end of the trailer, as shown in FIGS. 1–3 and 17–20, for protecting the carried vehicles against splashing and other debris from the wheels of both the trailer and passing vehicles.

Figure 2:
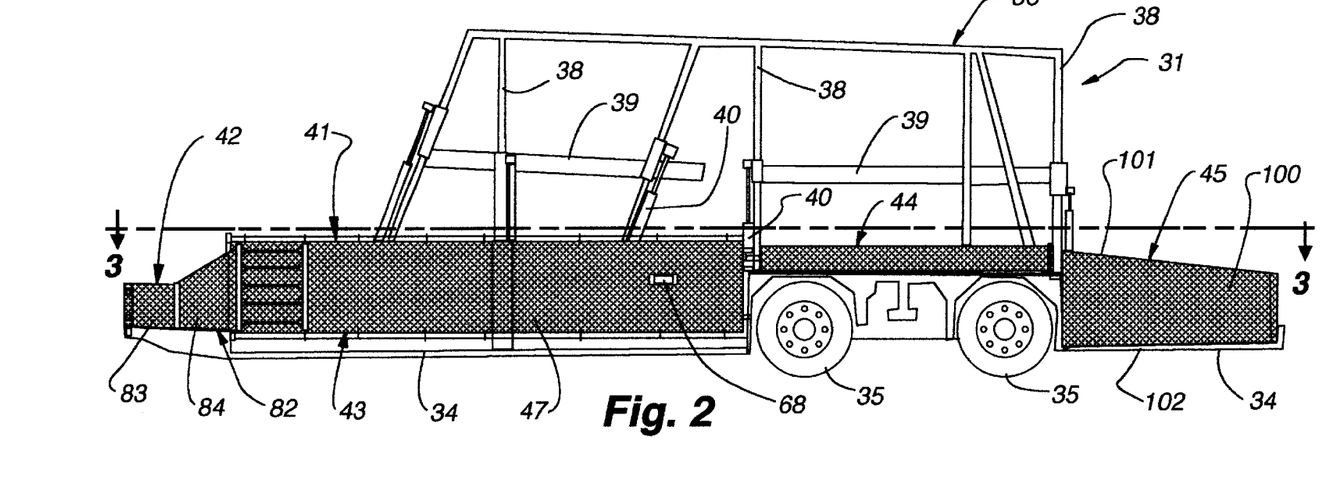
FIG. 2 is an enlarged side elevation view of a vehicle transport trailer of the character shown in FIG. 1.
Figure 3:
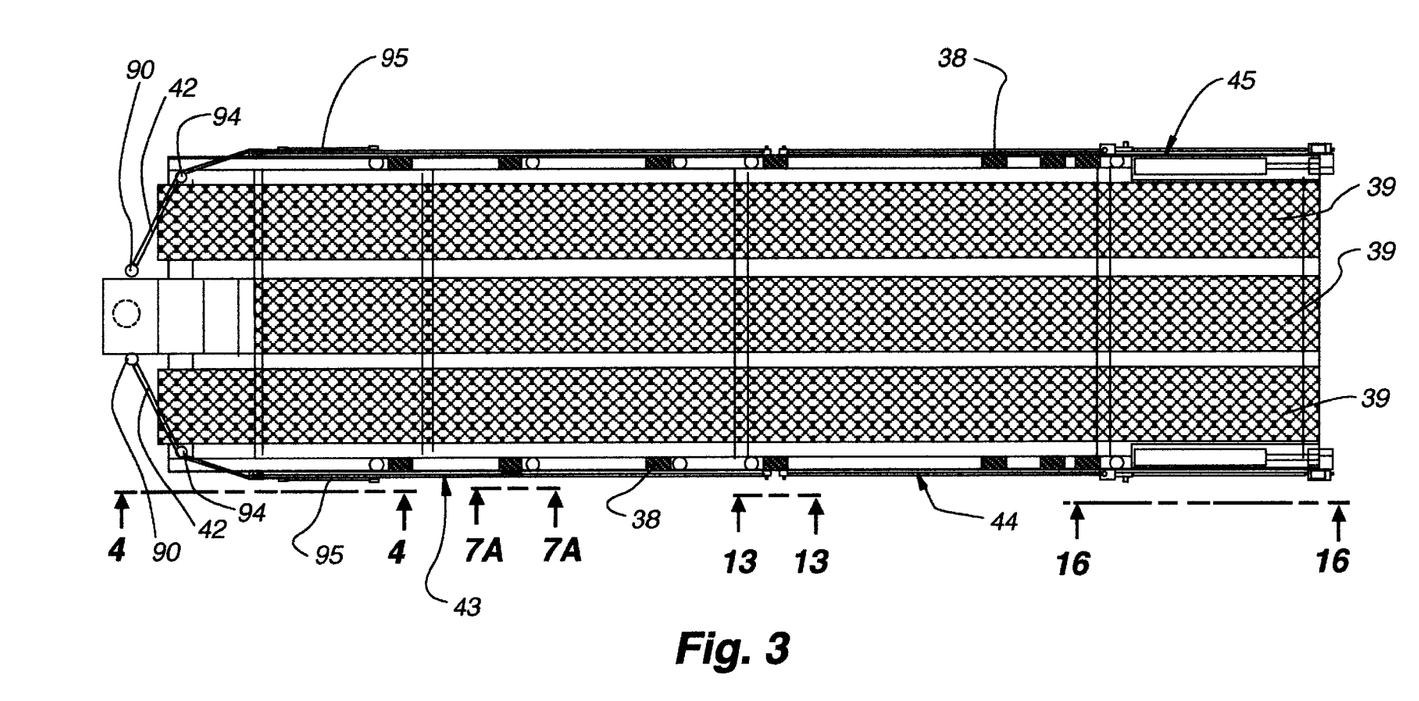
FIG. 3 is a plan view taken substantially in the plane of line 3—3 on FIG. 2.
Figures 4, 5, 6, 7A, 7B:
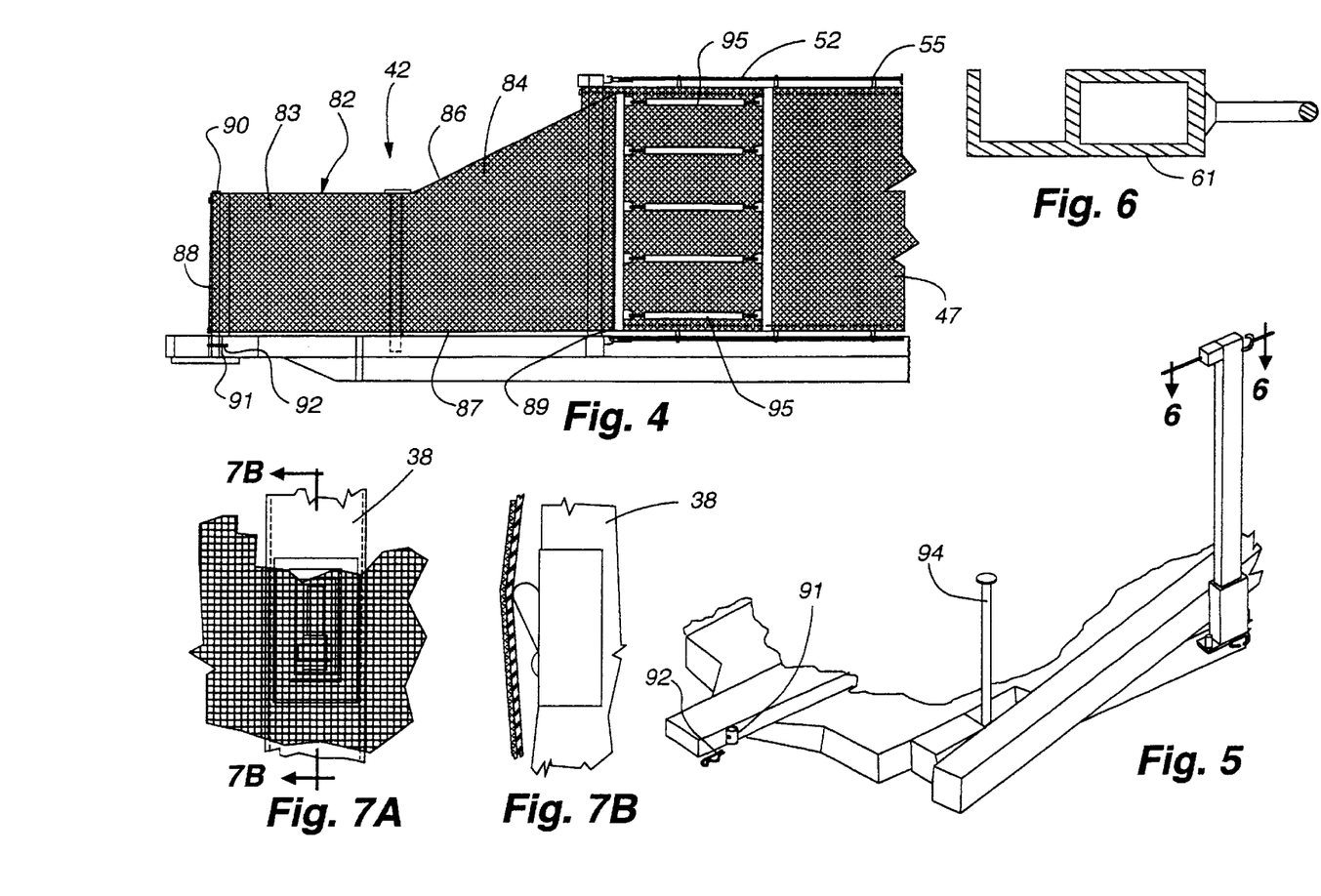
FIG. 4 is an enlarged partial side elevation view showing the front curtain or skirt embodying the present invention.
FIG. 5 is a partial perspective view of the front end of the trailer shown in FIG. 2.
FIG. 6 is a section view taken substantially in the plane of line 6—6 on FIG. 5.
FIG. 7A is a partial side elevation view taken substantially in the plane of line 7A—7A on FIG. 3 with parts cut away for clarity.
FIG. 7B is a section view taken substantially in the plane of line 7B—7B on FIG. 7.

Turning first to the middle or principal side screen section 43 of the skirt assembly, as shown generally in FIGS. 1–3, this section 43 comprises an elongated rectangular curtain or panel 47 defining upper and lower edges 48, 49 joined by lateral hemmed end edges 50, 51. The skirt panel 47 is supported on the trailer superstructure frame by a pair of spaced, taut, cables 52, 53 extending between upright trailer frame posts 38, and passing through rings 55 such as D-rings, circular rings, or the like secured to the upper and lower edges of the skirt panel 47. Turnbuckles 54 or like tightening devices are provided for tightening or adjusting the tension in all the cables referred to herein. With this construction, the skirt or curtain 47 can be stretched tightly in place for protecting the carried vehicles or collapsed to facilitate loading or unloading of vehicles. To stretch and hold the skirt panel 47 in place on the trailer 31, the lateral hems 50, 51 form fabric tubes through which front and rear support rods, pipes, or tubular posts 56, 57 extend. These curtain posts 56, 57 releasably engage the uprights 38 of the trailer frame 36 and secure the screen panel 47 thereto.

Figure 13:
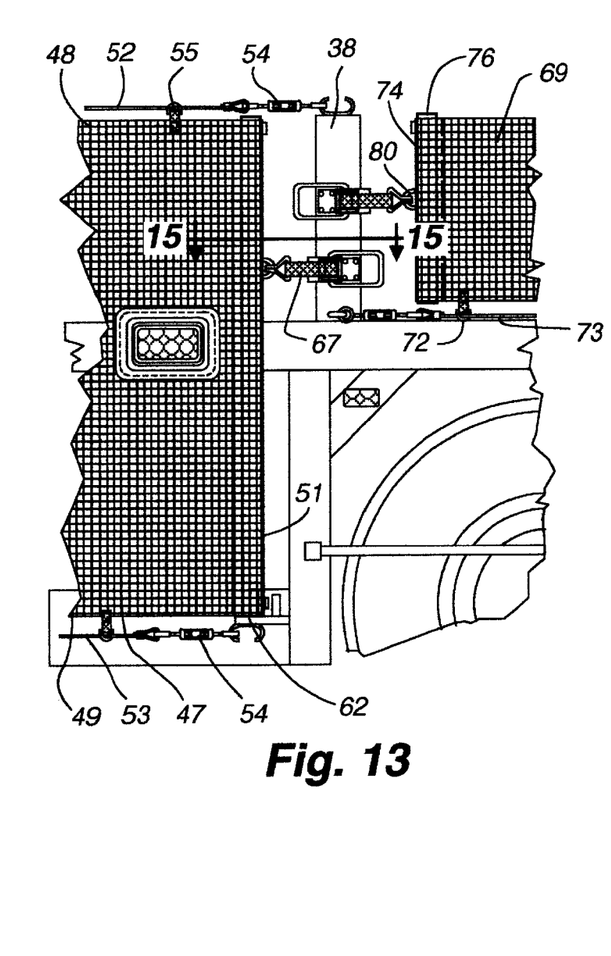
FIG. 13 is an enlarged fragmentary elevation view of a portion of the trailer shown in FIG. 2 with the screens secured in place.
Figure 14:
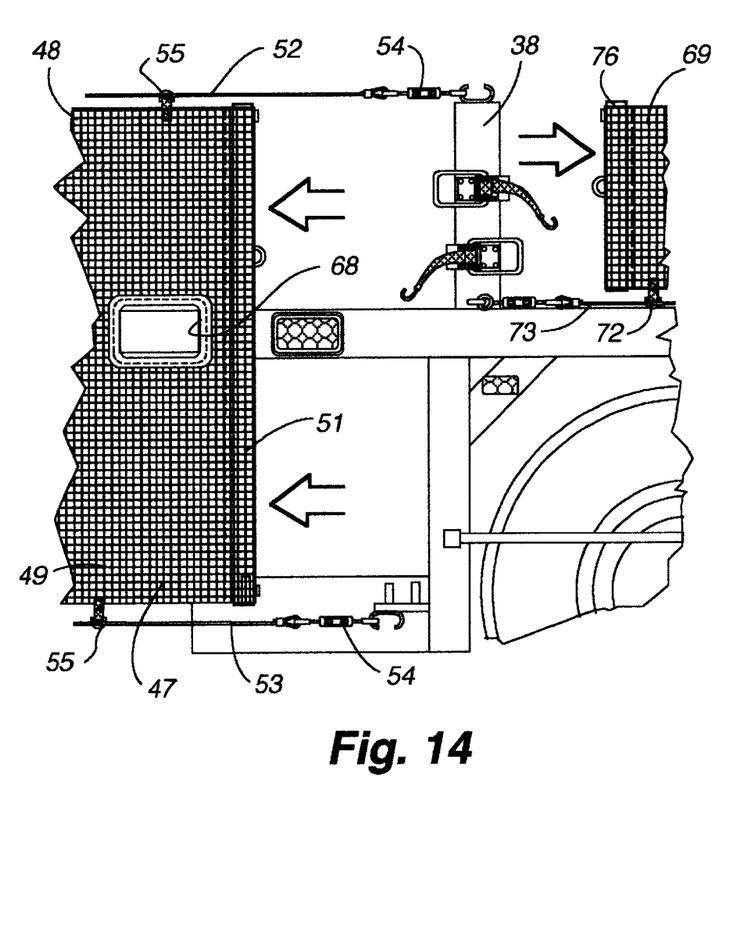
FIG. 14 is a view similar to FIG. 13 but showing the screens released.
Figure 15:
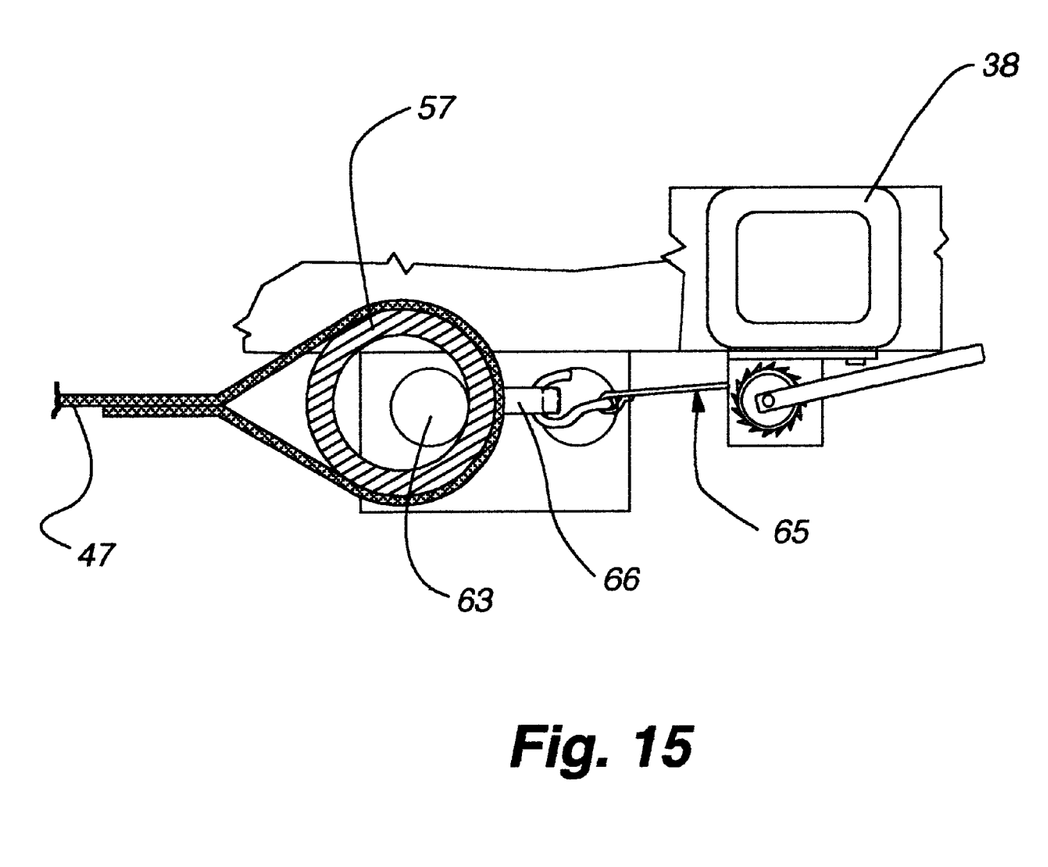
FIG. 15 to section view taken substantially in the plane of line 15—15 on FIG. 13.
Figure 16:
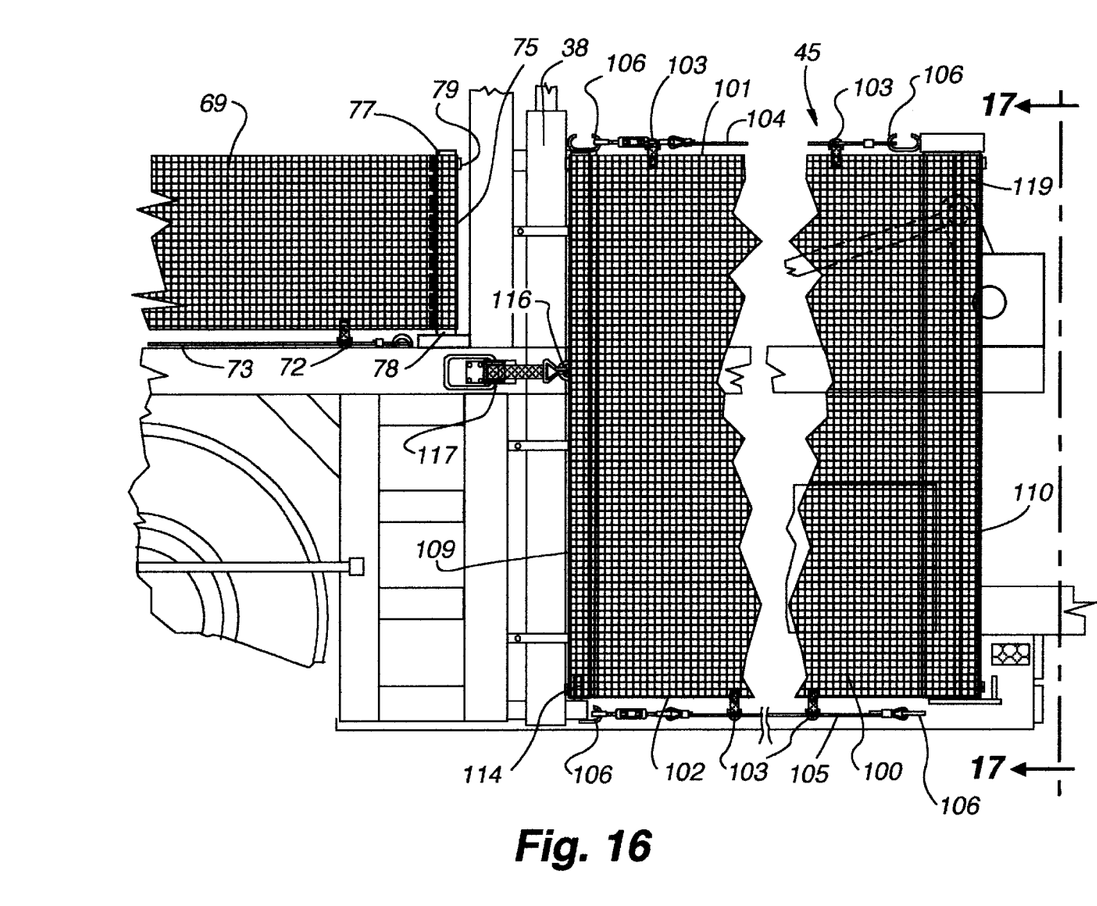
FIG. 16 is an enlarged fragmentary elevation view of a portion of the trailer shown in FIG. 2.
Figure 17:
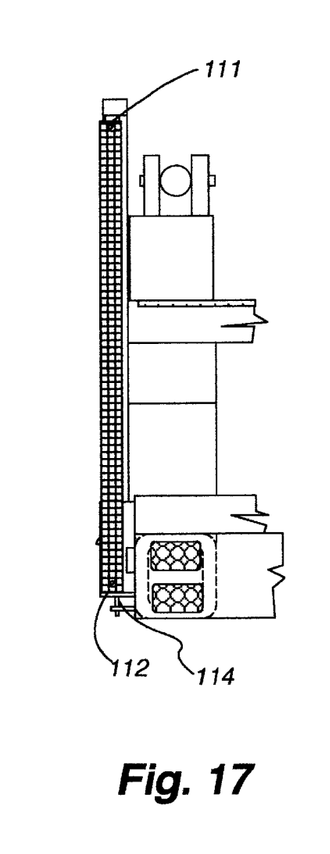
FIG. 17 is a section view taken substantially in the plane of line 17—17 on FIG. 16.
Figure 18:
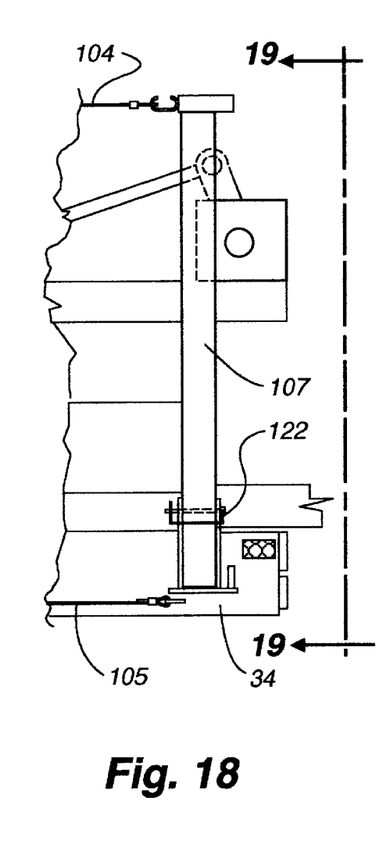
FIG. 18 is a fragmentary enlarged elevation view of the rear end portion of the trailer shown in FIG. 2.

At one lateral end of the curtain or screen 47, preferably the front end relative to the trailer 31, the lower or bottom end 58 of the curtain post 56 slips over an upwardly directed support pin 59 secured to the trailer frame 36 forming a part of the trailer superstructure, while the upper end 60 of the curtain post 56 releasably engages in a hook 61 secured to said frame post 38. As the other or rear lateral end 51 of the curtain panel 47, the lower or bottom end 62 of the rear curtain post 57 likewise engages an upwardly directed supporting pin 63 secured to an adjacent vertical trailer frame post 38. For stretching and tightening the curtain 47, a ratchet and strap tightening mechanism 65 is mounted on the chassis frame post 38 and includes a strap and hook 67 engaging a loop or eye 66 on the curtain post 57, as shown in FIGS. 13–15. By using a ratchet mechanism 65, the curtain can be easily tightened in place by actuating the ratchet or readily released. The ratchet is a conventional, commercial strap tightening ratchet mechanism.

When loading or unloading vehicles, the curtain 47 may be readily released by releasing the ratchet 65 and removing the posts 56, 57 from engagement with the hooks and pins on the trailer frame. The curtain 47 can then be slid along the cables 52, 53 to a position in which the curtain does not interfere with access to the trailer superstructure and loading mechanism. When cars or other vehicles have been loaded on the trailer, the curtain 47 is mounted in place by inserting the curtain post 56 at the front end on the associated pin 59 and engaging the post with the hook 61, and at the opposite or rear lateral end, engaging the post 57 on a pin 63 and connecting and tightening the ratchet and strap connector 65 to tightly stretch the curtain or screen in place.

An identical or similar curtain structure is provided on the opposite side of the trailer for protecting the opposite surfaces of the vehicles carried on the trailer. Various openings 68 may be cut into the skirt or curtain for exposing running lights and the like on the trailer. As many central main screen panels 47 may be used as are necessary to protect the vehicles carried on the trailer.

A similar elongated rectangular screen or curtain 69 is provided on each side of the trailer at a position thereon above the trailer wheels 35 as shown in FIGS. 13–16. Such a curtain panel 69 is narrower than the main side screen 47 and defines upper and lower longitudinal edges 70, 71. The lower longitudinal curtain edge 71 includes D-rings 72 engaging a cable 73 extending tautly between trailer frame posts 38 along the lower curtain edge. At each of its lateral end edges 74, 75 the curtain is hemmed to provide a tubes through which support tubes or posts 76, 77 extend. At the rear lateral end of the curtain panel 69, the post 77 engages a pin 78 and hook 79 for connecting the curtain 69 to the trailer frame. At its other or front panel end 74 the curtain post 76 includes a loop or eye 80 to which is connected a ratchet and strap mechanism 81 mounted on the chassis frame for tightening the curtain 69 in place or easily releasing it.

For protecting carried vehicles from rocks and debris not only thrown by a passing vehicles but also by the wheels of the tractor truck 30, the curtain or skirt assembly 41 embodying the present invention includes a front skirt section 42 which extends from a side of the trailer 31 inwardly towards the hitch thereof. To this end, the front or forward skirt section 42 includes a front curtain panel 82 having as its forward end a generally rectangular front panel 83 and integral therewith a rearwardly extending generally trapezoidal panel 84. The front screen panel 82 defines upper and lower edges 86, 87, and is hemmed at its front and rear lateral edges to define hem tubes 88, 89. The front lateral edge vertical hem tube is engaged over a mounting post 90 which extends into supporting engagement in a. tubular socket 91 on the front end of the trailer chassis 34. The supporting tube 90 is secured in the frame socket 91 by a pin or clip 92.

Figures 8, 9:
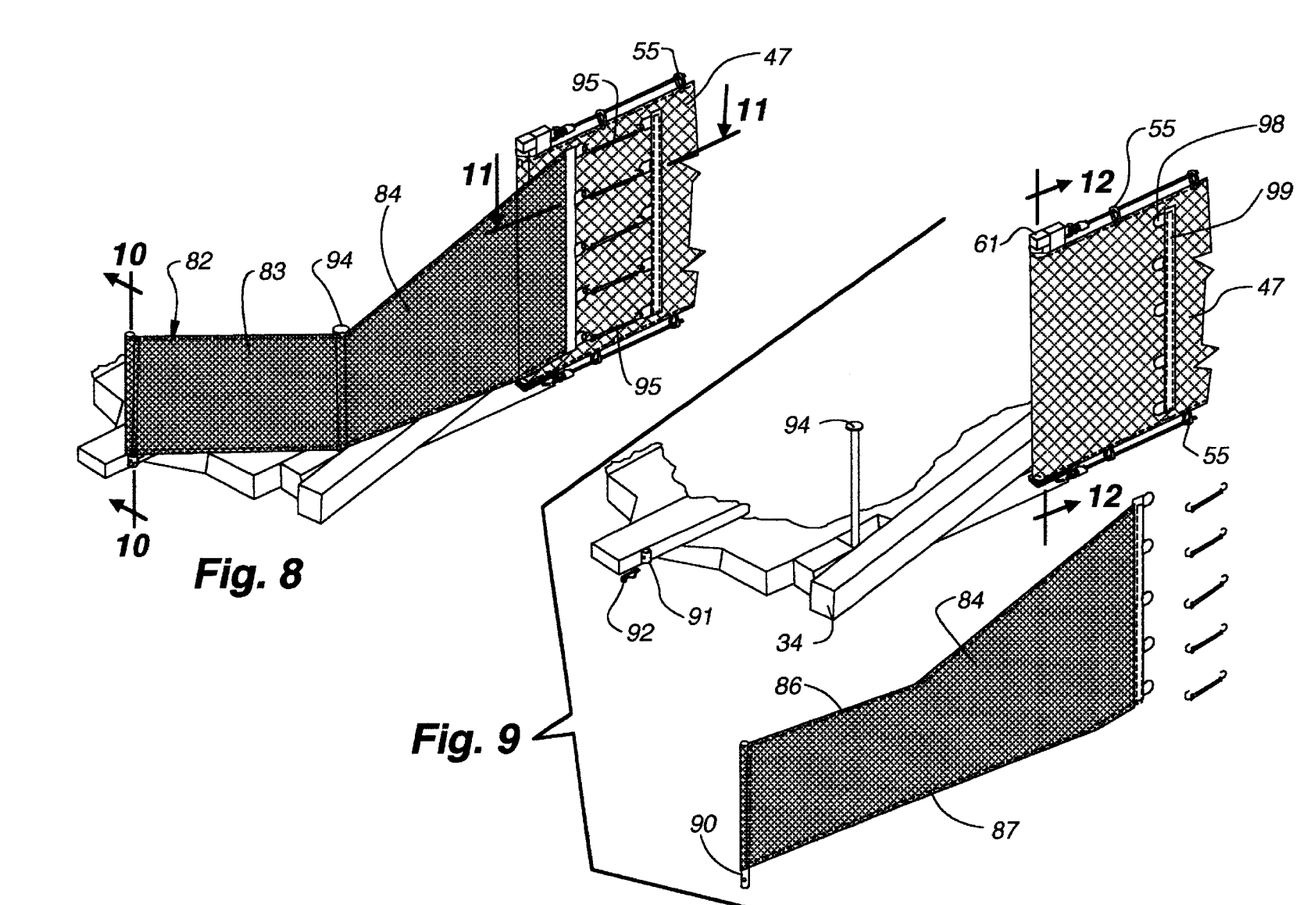
FIG. 8 is a partial perspective front view of the trailer shown in FIG. 2.
FIG. 9 is an exploded perspective view of the trailer portion shown in FIG. 8.
Figures 10, 11, 12:
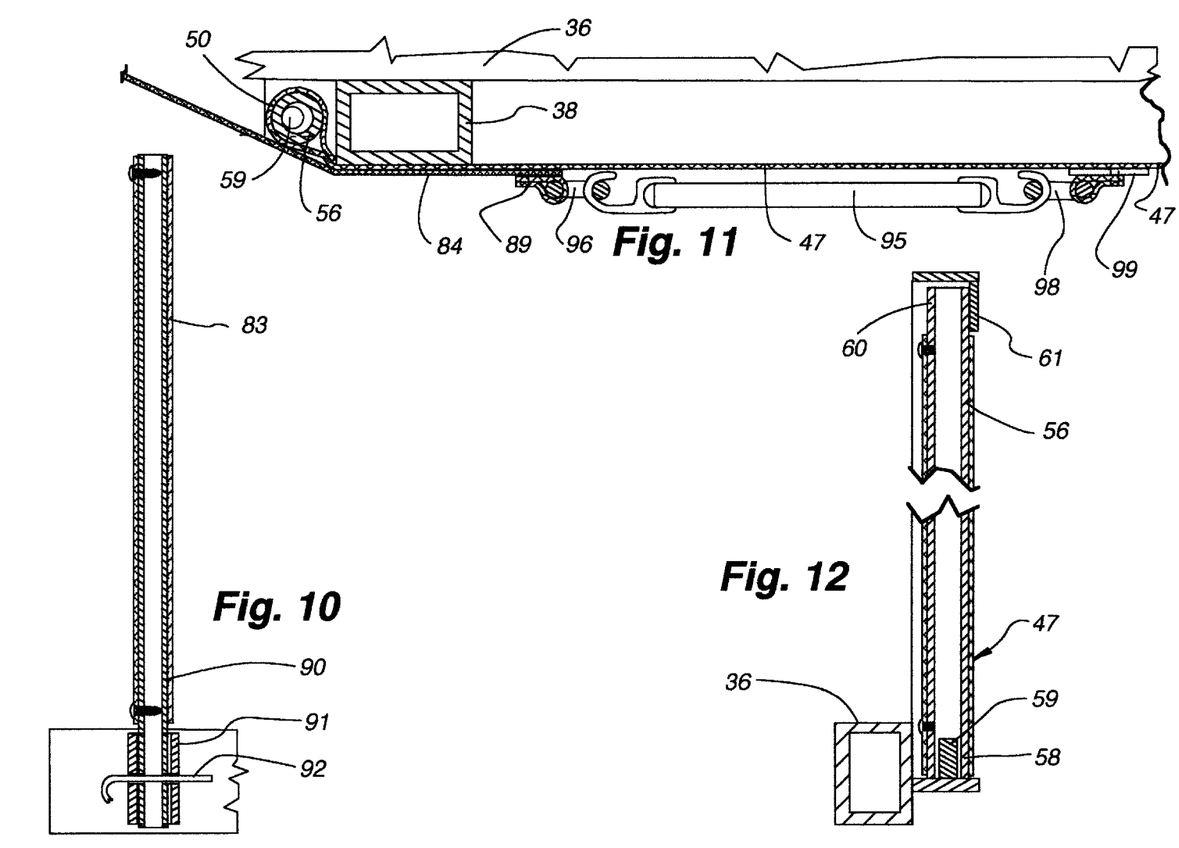
FIG. 10 is a section view taken substantially in the plane of line 10—10 on FIG. 8.
FIG. 11 is a section view taken substantially in the plane of line 11—11 on FIG. 8.
FIG. 12 is a section view taken substantially in the plane of line 12—12 on FIG. 9.

The front panel 82 inclines rearwardly outwardly and over an intermediate vertical post 94 mounted on the trailer chassis 34 as shown in FIG. 8. A suitable reinforcing hem may be provided to engage the post 94. The trapezoidal panel section 84 of the front panel 82 is secured to the main curtain panel 47 by bungee cords 95 extending between spaced apart D-rings 96 mounted on the rear hem edge 89 of the front trapezoidal panel 84, and D-rings 98 secured to a reinforcing rib 99 on the main screen panel 47.

At the rear end of the trailer 31 a rear skirt section 45 is provided to shield carried vehicles 32 from rocks and debris from the trailer wheels 35 and other passing vehicles. This skirt or curtain section 45 includes a panel 100, which may be rectangular or trapezoidal in configuration, and defines upper and lower edges 101, 102, and provided along said edges with D-rings 103 strung on associated upper and lower cables 104, 105 stretched tightly between hooks 106 on a chassis frame upright or post 38 or hydraulic cylinder, and a swingable post or upright 107 mounted at the rear of the chassis 34 as shown in FIGS. 16–20. The front and rear lateral end edges 109, 110 are hemmed to define hem tubes. The rear curtain panel 100 is secured at its front lateral edge 109 by means of a tubular post 111 which extends through the front lateral edge hem tube and at its lower end 112 engages a pin 114 mounted on the trailer frame and at or adjacent its upper, end 115 is provided with a loop or eye 116 which engages a ratchet and strap mechanism 117 on a chassis frame post.

Figures 19, 20:
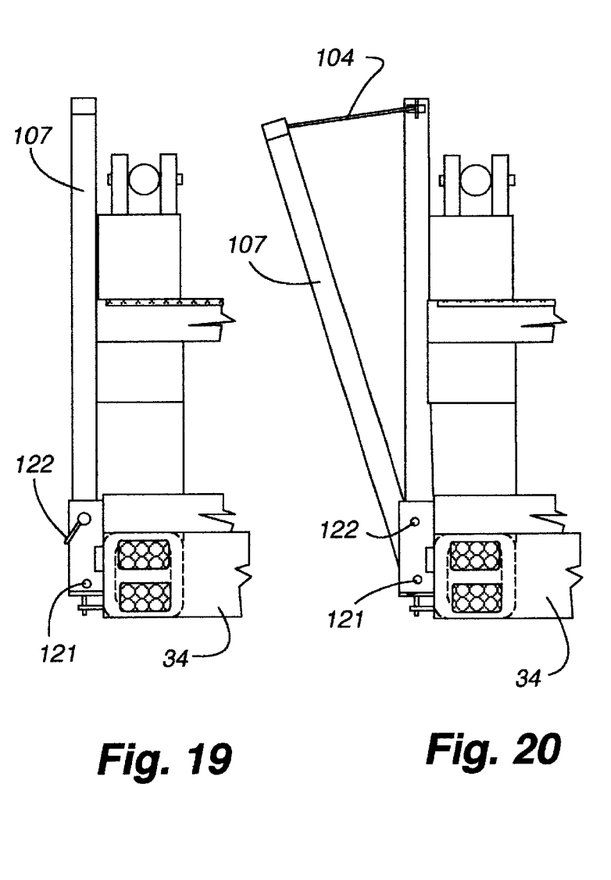
FIG. 19 is an elevation view taken substantially in the plane of line 19—19 on FIG. 18.
FIG. 20 is elevation view similar to FIG. 19 but showing a mounting post swung away for purposes of loading the vehicle trailer.

The rear lateral end edge 110 of the rear skirt panel 100 is likewise hemmed to provide a hem tube which receives a tubular post 119 that releasably engages the swingable vertical post or upright 107 by a pin and hook structure as described above. The vertical frame post 107 is swingably mounted in a bracket 120 on the trailer chassis by a pivot pin 121 and is secured in an upright position by a latch pin 122 extending through the post 107 and bracket 120. By releasing the latch pin 122, the upper end 123 of the post 107 can be swung outwardly and away from the trailer loading mechanism as shown in FIG. 20 to facilitate loading of vehicles on the trailer ramps without interference from the curtain or skirt.

The skirt 100 is secured to the rear post 107 in the same manner as described above, by using a tubular post 124 extending through the hem tube 109, which post 124 has a lower end 125 which engages a pin 126 on the bracket 120, and an upper end 127 which engages in a hook 128 on the swingable post 107. The skirt 100 is tightened and released in the same manner as described above.

It should be understood that the curtain or skirt structures on each side of the trailer are substantially identical in most respects. Various openings may be cut in the skirts to provide for access to the trailer controls, running lights and the like.

The side skirts or curtains are made of any suitable material such as abrasion resistant reinforced vinyl mesh. The mesh is light in weight and allows for see-through inspection of vehicles on the trailer. The front skirts or curtains may be of solid vinyl coated sheets to afford an additional measure of protection. The skirts or curtains may also be referred to as screens, sheets, tarpaulins, tarps, and like terms.

While the present invention has been described in considerable detail, it should be understood that there is no intention to limit the invention to the specific structure shown and described. On the contrary, the intention is to cover all modifications, alternative constructions, equivalents, and uses falling within the spirit and scope of the invention as expressed in the appended claims.

What is claimed is:

1. A releasable protective skirt assembly for an open frame trailer adapted to transport vehicles, said trailer having a wheeled chassis supporting a frame and track assembly with vertically extending posts secured to and upstanding from said wheeled chassis, said trailer having a front-end adapted to be mounted in towing engagement on a tractor truck, a rear end adapted for loading and unloading vehicles, and a middle section including said frame and track assembly for supporting said vehicles, said protective skirt assembly comprising: a pair of first horizontal elongated skirt sections releasably mountable on said chassis one on each side thereof in tightly stretched screening position on said trailer front end; a pair of second horizontal elongated skirt sections releasably mountable on said chassis one on each side thereof in tightly stretched screening position on said trailer middle section; a pair of third horizontal elongated skirt sections releasably mountable in screening position one on each side of said chassis in tightly stretched screening position above the chassis wheels; and a pair of fourth horizontal elongated skirt sections releasably mountable on said chassis one on each side thereof in tightly stretched screening position on said trailer rear section; said second skirt section comprising spaced apart upper and lower cables tautly securable between said chassis frame uprights; a generally horizontal elongated rectangular skirt panel defining upper and lower edges and opposed lateral end edges extending between said upper and lower edges, each said lateral edge having a hem defining a hem tube thereon; a plurality of spaced apart rings secured to said upper and lower edges and slidably engagable with said cables for supporting said panel thereon; and support tubes extending vertically through said hem tubes and releasably connectable to said chassis frame uprights for supporting said panel; whereby said skirt is tightly but releasably supportable on said uprights and cables and vehicles carried on said trailer are protected against damage from rocks and road debris during transit.

2. A skirt assembly as defined in claim 1 wherein said second and third skirt sections comprise generally horizontally elongated rectangular panels.

3. A skirt assembly as defined in claim 1 wherein said second skirt section comprises a generally horizontally elongated rectangular panel.

4. A skirt assembly as defined in claim 1 wherein said fourth skirt section comprises a generally horizontally elongated trapezoidal panel.

5. A skirt assembly as defined in claim 1 wherein said first skirt section comprises a generally horizontally elongated rectangular panel integral with a generally trapezoidal panel.

6. A protective skirt assembly for a vehicle transporting trailer mounted along a side of the chassis of said trailer, said chassis defining frame uprights, said skirt assembly comprising supporting cables securable to and extendable between said chassis frame uprights; a skirt comprising a panel defining upper and lower edges and lateral end edges joining said upper and lower edges, each lateral edge having a hem defining a hem tube thereon; a plurality of spaced apart rings secured to said upper and lower edges for slidably engaging said cables; and support tubes extending vertically through said hem tubes and releasably connectable to said chassis frame uprights for supporting said panel; whereby said skirt assembly is tightly but releasably supported on said chassis.

7. A protective skirt assembly as defined in claim 6 further comprising a ratchet mechanism for tightening said skirt on said chassis frame.

8. A protective skirt assembly as defined in claim 6 further comprising a pin and hook mechanism for holding said skirt on said chassis frame.

9. A protective skirt assembly for a vehicle transporting trailer mountable along a side of the chassis of said trailer adjacent the rear end thereof, and comprising a fixed frame upright securable to said chassis, an outwardly swingable upright pivotally mountable on said chassis, supporting cables securable in extending relation between said frame uprights; and a skirt comprising a panel defining upper and lower edges and lateral end edges joining said upper and lower edges, each lateral edge having a hem defining a hem tube thereon; a plurality of spaced apart rings secured to said upper and lower edges and slidably engaging said cables; and support tubes extending vertically through said hem tubes and releasably connectable to said uprights for supporting said panel; whereby said skirt is tautly but releasably supportable on said uprights and cables, and said swingable upright can be pivotally swung outwardly to position said skirt away from vehicles being loaded on or unloaded from said trailer.

10. A method of protecting vehicles transported on a transport trailer having a wheeled chassis and a vehicle supporting frame mounted thereon defining frame uprights, and utilizing a skirt assembly, said method comprising:

releasably mounting a horizontally elongated, protective skirt assembly on said chassis in position thereon for shielding and protecting said vehicles; said skirt assembly comprising supporting cables securable to and extendable between said chassis frame uprights; a skirt comprising a panel defining upper and lower edges and lateral end edges joining said upper and lower edges, each lateral edge having a hem defining a hem tube thereon; a plurality of spaced apart rings secured to said upper and lower edges for slidably engaging said cables; and support tubes extending vertically through said hem tubes and releasably connectable to said chassis frame uprights for supporting said panel;

releasing said skirt sections to facilitate vehicle loading or unloading; and engaging and tautly securing said skirt sections on said chassis and frame in protective relation to at least a portion of the vehicles carried thereby.

11. A method of protecting vehicles transported on a transport trailer having a wheeled chassis and a vehicle supporting frame mounted thereon defining frame uprights, and utilizing a skirt assembly, said method comprising:

releasably mounting a horizontally elongated, protective skirt assembly on said chassis in position thereon for shielding and protecting at least a portion of said vehicles, said skirt assembly comprising supporting cables securable to and extendable between said chassis frame uprights; a skirt comprising a panel defining upper and lower edges and lateral end edges joining said upper and lower edges, each lateral edge having a hem defining a hem tube thereon; a plurality of spaced apart rings secured to said upper and lower edges for slidably engaging said cables; and support tubes extending vertically through said hem tubes and releasably connectable to said chassis frame uprights for supporting said panel.

12. In combination, a protective skirt assembly and an open frame trailer adapted to transport vehicles, said trailer comprising a wheeled chassis and a frame and track assembly supported on said chassis and defining frame uprights, said trailer having a front-end adapted to be mounted in towing engagement on a tractor truck, a middle section including said frame and track assembly for supporting said vehicles for transport, and a rear end adapted for loading vehicles on and unloading vehicles from said frame and track assembly; and said protective skirt assembly comprising supporting cables securable to and extendable between said chassis frame uprights; a skirt comprising a panel defining upper and lower edges and lateral end edges joining said upper and lower edges, each lateral edge having a hem defining a hem tube thereon; a plurality of spaced apart rings secured to said upper and lower edges for slidably engaging said cables; and support tubes extending vertically through said hem tubes and releasably connectable to said chassis frame uprights for supporting said panel; whereby vehicles carried on said trailer are protected against damage from rocks and road debris.

* * * * *